A. S. RAMAGE.
PROCESS OF RECOVERING LITHARGE FROM SUGAR RESIDUES.
APPLICATION FILED JAN. 29, 1921.
1,433,034. Patented Oct. 24, 1922.
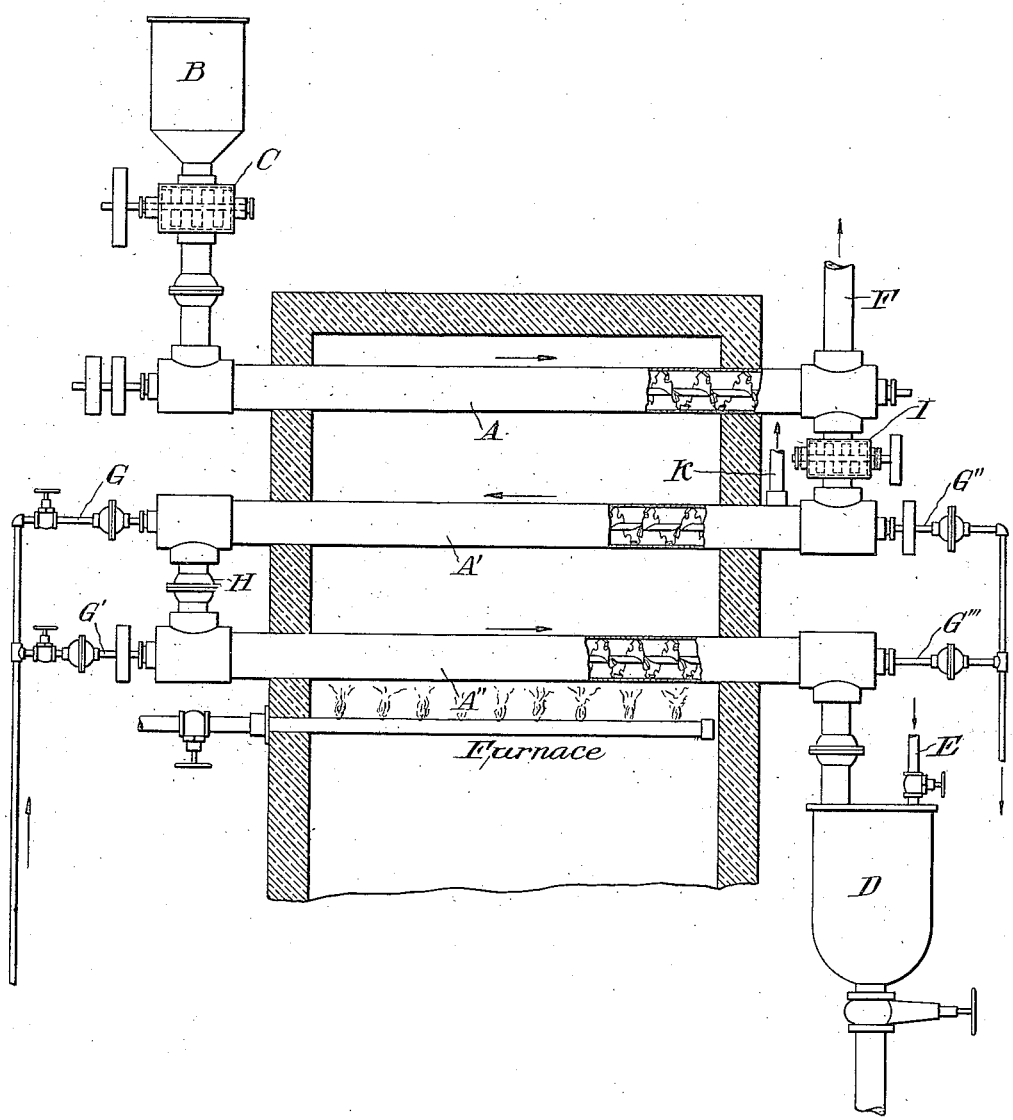

Patented Oct. 24, 1922.

1,433,034

UNITED STATES PATENT OFFICE.

ALEXANDER S. RAMAGE, OF DETROIT, MICHIGAN, ASSIGNOR TO FRANK F. BEALL, FRANK L. KLINGENSMITH, AND SAID ALEXANDER S. RAMAGE, TRUSTEES, KNOWN AS THE SUGAR RESEARCH SYNDICATE, LTD.

PROCESS OF RECOVERING LITHARGE FROM SUGAR RESIDUES.

Application filed January 29, 1921. Serial No. 441,070.

*To all whom it may concern:*

Be it known that I, ALEXANDER S. RAMAGE, a citizen of the United States, residing at Detroit, in the county of Wayne, and State of Michigan, have invented certain new and useful Improvements in Processes of Recovering Litharge from Sugar Residues, of which the following is a specification.

In the separation and recovery of sucrose from impure solutions, and particularly from cane molasses, whether derived from the refining of raw sugar, or directly from the cane syrups, and also from beet molasses, and particularly from those which have been kept, and are more or less decomposed, or inverted, sucrose is precipitated as lead sucrate by means of litharge, or lead oxid, together with lead non-sugars, and the mixed precipitate treated so as to yield on the one hand a practically pure solution of sucrose, and on the other hand a mixed precipitate of lead basic carbonate and lead non-sugars.

My invention consists in a process of recovering litharge from a precipitate of this kind, which litharge may be used in a continuation of the process or for other purposes.

In a former application Serial No. 312,640 now pending I have explained the various reactions between lead oxid and the inverted sugars found in cane molasses. Also the fact that the precipitate of lead carbonate and lead non-sugars produced by carbonation of the lead sucrate precipitate is readily reduced to spongy lead, which catches fire in presence of air.

I find in practice that the lead precipitate formed by carbonation contains with the lead carbonate, about 30 to 40% organic matters, especially when it has been produced from molasses that has stood for some considerable time. Also that when even traces of caustic alkalies are present in the lead oxid used to precipitate the sucrose, the precipitate is very slimy and cannot be well washed, thereby leaving sucrose present in the precipitate, which upon subsequent heating to regenerate the lead oxid reduces the lead oxid to spongy lead, since the heat generated by access of air to the reduced oxid and spongy lead melts some of the lead into globules like shot, and these will not readily oxidize, so that the lead precipitate, composed of lead carbonate, and lead non-sugars, when roasted by any of the known methods always contains from 10 to 20% metallic lead in globules.

My invention is a method of exposing a mass of the reduced mixture containing the maximum of reduced lead to a current of air from which the maximum of oxygen has been removed, and gradually as the reduced lead is oxidized exposing the declining amounts of reduced lead to an increasing amount of oxygen, and thereby regulating the exothermic reaction so that the spongy lead is not aggregated into difficultly oxidizable particles. This is done by causing the lead precipitate to travel through tubes kept at a regulated temperature, and at the same time causing the reduced mass to meet a heated current of air from which most of the oxygen has been removed, and as the mass proceeds down the tubes and loses its metallic content meeting air which has an increased amount of oxygen so that in the last tube the reduced metal is almost all removed and the current of air contains the maximum amount of oxygen.

The gases from the furnace tubes are passed into the carbonators and any lead oxid or fumes are thereby condensed and remain in the process.

The litharge from the tubes is commercially pure and will produce with molasses a crystalline lead sucrate which can be readily washed, and so the operation can be repeated over and over again.

The class of furnace that I prefer is shown in the accompanying drawing. A, A', A'' are three tubes fitted with cut and flight folded conveyors which lift up and throw backwards the material while at the same time conveying it forward, so as to afford a complete exposure of every article to the heated gas and a continuous conveyance of the material to be roasted from the hopper B to the receiver D. Both hopper and receiver are closed. D is fitted with air pipe E with a valve through which a given amount of air is traveling from the receiver D through tube A'' thence by connection H through the tube A' thence through connection I out through pipe F to the carbonators or may be led directly to the carbonators through pipe K. The carbonic acid gas liberated in tube A also passes out through pipe F to the carbonators. L is a source of external heat such as a gas burner. Hopper B is charged with the mixture of lead carbonate and lead non-sugars, preferably in a dry and powdered state, and then closed air tight. The mixture is fed into tube A through the tooth feed C. The tube A is kept at a temperature of about 180° C. for mixtures from cane molasses, and about 250° C. for mixtures from fresh beet molasses. The speed of the cut and flight folded conveyor is such that the carbonic acid gas is all liberated in tube A. The mixture now contains lead oxid, spongy lead in a very finely divided state, and some free finely divided carbon. A current of air is now passed through tubes A″ and A′ from receiver D at such a speed that most of the oxygen has been absorbed before it reaches connection I or outlet K. According to the amount of organic compounds in the mixture the temperature of the air current is regulated. This may be accomplished by introducing a cooling fluid through pipes G, G′, G″, G‴ into the hollow shafts of the conveyors or by regulating the external heat and the amount of air passed through. In no case must the temperature of tube A′ rise above 300° C. otherwise the finely divided lead will coalesce. Should the mixture of lead carbonate and lead non-sugars contain about 10% organic matters then it is preferable to add two more tubes so that a graduation of temperature of 300°, 400°, 500° and 600° C. is provided. In other words with the lead precipitate from fresh beet molasses I would use a three tube furnace, and with the precipitate from decomposed beet molasses or from cane molasses I would use a five tube furnace.

Following is a specific illustration of my process it being understood, however, that the invention is not limited to the employment of the precise proportions mentioned by way of illustration, or to the exact operating conditions hereinafter detailed.

One ton of cane molasses is run into a tank fitted with agitating apparatus, and diluted with one to two tons of water. One ton of litharge is now added little by little either dry or in paste in water. The temperature is kept about 70° to 80° C. in order to decompose the invert sugars. The mass is now run off into another tank and allowed to cool, and is then filtered, and the precipitate well washed. The mother liquor, or filtrate will contain a large quantity of soluble lead non-sugars, which will precipitate on standing about 12 hours.

The settled mother liquor is then carbonated to recover any soluble lead, or the mother liquor can be carbonated directly after filtering.

The lead precipitate from the carbonation of the mother liquor is added to the material going to the furnace.

The lead precipitate from the molasses solution after washing is placed in a carbonator with some water, and carbonated in the usual way until polarization does not increase. The contents of the carbonator are then filtered and washed, the filtrate containing the sucrose in a nearly pure solution of about 98% purity, and the precipitate being lead basic carbonate and leal non-sugars. The juice is treated with about 1% lime and then carbonated to slight alkalinity and then treated in the usual way to crystallize the sugar.

The lead precipitate is then dried and powdered, and fed into the furnace. In the passage of the first tube heated to about 160° C. the lead non-sugars are decomposed as is also the carbonate. The mixture passing into the second tube will contain about 30% finely divided lead which here meets air containing about 2% oxygen. The finely divided metal powder commences to oxidize slowly with the evolution of heat, and this must not rise above 300° C., and on leaving this second tube will then contain about 15% metal powder. The oxidation is thus gradually continued until the litharge is discharged from the last tube (kept at about 600° C.), perfectly soluble without residue in acetic acid.

This is then used again with another ton of molasses, and the operation is repeated over and over again. The gases from the furnace are drawn from pipe F or pipe K and forced through the carbonators to wash out any trace of lead oxid. In the case of inverted beet molasses which have been kept a long time the method is similar, but in the case of fresh beet molasses where the amount of lead non-sugars in the precipitate from carbonation does not exceed 10% the second tube can be kept at 300° C., and the third tube at 600° C.

In the case of decomposed cane molasses where the amount of lead organic matters are extremely large then the tubes can be jacketed and the temperature can be regulated by passing steam around the tubes, the steam being superheated and can be used to heat the first tube.

Any other kind of a furnace arrangement can be used always provided that the principle be followed that the finely divided metal meets the smallest amount of oxygen, and as it becomes oxidized it is subjected to ever increasing amounts of oxygen until it is completely oxidized.

Heat or cooling can be applied in any of the well known ways always providing that the heat gradually rises as the percentage of finely divided metal decreases.

I claim:—

1. The method of recovering litharge from sugar residues containing lead carbonate and lead non-sugars, which consists in subjecting the mixture in continuous flow to a gradually increasing controlled temperature, and to a reverse flow of a current of air whose oxygen content is gradually reduced, the lead content being thus first reduced to metallic lead which is gradually oxidized under increasing temperature and increasing oxidizing conditions to litharge.

2. The method of recovering litharge from sugar residues containing lead carbonate and lead non-sugars, which consists in subjecting the mixture in continuous flow to a temperature sufficient to drive off the carbonic acid and to cause reduction of the lead compounds to metallic lead, and then progressively subjecting the finely divided metallic lead to increasing controlled temperature and oxidizing conditions sufficient to oxidize the lead to litharge.

In testimony whereof, I affix my signature.

ALEXANDER S. RAMAGE,